United States Patent Office 3,755,565
Patented Aug. 28, 1973

3,755,565
METHOD FOR INHIBITING BLOOD
PLATELET AGGREGATION
Robert L. Spraggins, San Jose, Calif., assignor to
Alza Corporation
No Drawing. Filed June 23, 1971, Ser. No. 156,074
Int. Cl. A61k 17/00
U.S. Cl. 424—101                                     7 Claims

ABSTRACT OF THE DISCLOSURE

A method for inhibiting blood platelet aggregation by adding to platelets a prostaglandin of the general formula:

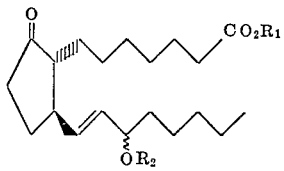

wherein $R_1$ is hydrogen or alkyl, $R_2$ is hydrogen or acyl, its diastereomers and non-toxic salts.

BACKGROUND OF THE INVENTION

The present invention relates to a novel and useful method for inhibiting platelet aggregation. More particularly, the invention pertains to a method for inhibiting platelet aggregation while simultaneously preserving their function and integrity by adding to platelets a prostaglandin compound represented by Formula 1 of the following general formula:

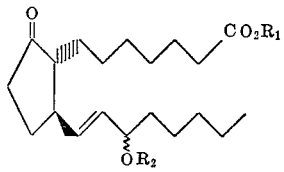

Formula 1 wherein $R_1$ is a member selected from the group consisting of hydrogen and lower alkyl, $R_2$ is a member selected from the group consisting of hydrogen and acyl of 1 to 18 carbon atoms inclusive, the diastereomers and the pharmaceutically acceptable salts.

The use of blood platelet transfusions as a therapeutic agent is an accepted practice in the medical arts. The art uses platelets for treating thrombocytopenia, hemodialysis, leukemia, lymphoma, bone marrow depression, for generally maintaining vascular integrity, and for other like medical uses. These therapeutic uses created a continual and increasing need for preserving platelets, which need also required that platelets be stored for present or for future use. Past efforts to preserve or store platelets most frequently lead to unacceptable results, such as, platelet stickiness or platelet aggregation, to changes in the platelet's shape from a normal disc-shaped platelet into a swelled globular cell form, and to a marked decrease of platelet viability. Presently, certain prostaglandins, particularly those of the "E" series, such as: 11α, 15(S)-dihydroxy-9-oxo-13-trans-prostenoic acid, 11α,15 (S)-dihydroxy-9-oxo-13-trans,8-iso-prostenoic acid and, 11α,15(S) - dihydroxy-9-oxo-13-trans-ω-homo-prostenoic acid, have been demonstrated to overcome the unacceptable results known to the prior art by their ability to essentially inhibit induced platelet aggregation; Biochem. Biophys. Acta, vol. 187, pages 285 to 292, 1969; and Circulation, vol. 38, Supp. 4, VI-23, 1968. However, while the above disclosed prostaglandins are known to possess platelet anti-aggregation properties, their use for preserving platelets has been seriously limited because the monenoic, dienoic and trienoic prostaglandins of the "E" series have β-hydroxy ketone functionality that readily undergoes dehydration to form a prostaglandin having an α,β-unsaturated ketone functionality which type of prostaglandin is essentially without platelet anti-aggregation properties. Additionally, the prostaglandins of the "E" series readily undergo auto-oxidation to other forms of prostaglandins that lack platelet anti-aggregation properties; Methods of Biochemical Analysis, vol. 17, pages 325 to 371, 1969. Thus, in view of this presentation, it becomes immediately apparent that a critical need exists for a method for inhibiting aggregation of platelets that is essentially free from the tribulations associated with the prior art. Likewise, it will be further apparent that if a new and useful method for protecting platelets is made available to the art, especially wherein the platelet anti-aggregation agent possesses stability, said method would have a positive medical value and it would also represent a substantial contribution to the art.

Accordingly, it is an immediate object of this invention to provide a novel and useful method for protecting blood platelets that is not subjected to the difficulties associated with the prior art.

Yet another object of the present invention is to provide a method for essentially inhibiting aggregation of platelets.

Still another object of the invention is to provide a prostaglandin possessing platelet anti-aggregation properties for use in protecting platelets during storage.

Still yet another object of the invention is to provide a stable prostaglandin that is useful as a platelet anti-aggregation agent.

Yet still a further purpose of the invention is to provide a method for maintaining platelet rich plasma, platelet concentrates and platelets by adding thereto a prostaglandin possessing platelet anti-aggregation properties.

These objects, as well as other objects, features and advantages of this invention, will become more readily apparent to those skilled in the art from the following detailed description and the accompanying claims.

SUMMARY OF THE INVENTION

The invention concerns a novel method for inhibiting platelet aggregation while simultaneously maintaining the platelet's integrity and viability by adding to platelets, or to a media containing platelets a compound of the general formula:

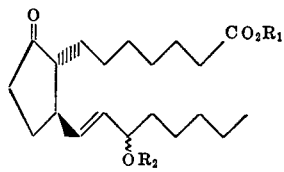

wherein $R_1$ is hydrogen or alkyl, $R_2$ is hydrogen or acyl, its diastereomers and pharmaceutically acceptable salts.

DESCRIPTION OF THE INVENTION

In attaining the objects, features and advantages of the present invention, it has now been found that prostaglandins embraced by Formula 1 can be used as stable, anti-aggregation platelet agents by adding the compounds to platelets, plasma containing platelets, platelet rich concentrates, or other media containing platelets.

The prostaglandins suitable for the purpose of the invention that act as anti-aggregation or anti-clumping agents, and when the terms aggregation and clumping are used herein they are to be construed as equivalents, are the prostaglandins embraced by Formula 1 as follows:

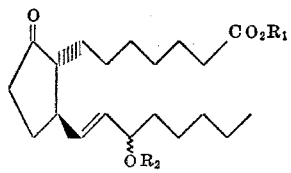

Formula 1 wherein $R_1$ is hydrogen or lower alkyl, $R_2$ is hydrogen or acyl, the diastereomers, and non-toxic acceptable salts.

In the present disclosure and the accompanying claims the definitions of symbols and terms in the foregoing Formula 1 and where they appear elsewhere throughout this specification and the accompanying claims, their usage thereof has the following significance:

By "lower alkyl" is meant straight or branched chain alkyl radicals of 1 to 8 carbon atoms inclusive, such as methyl, ethyl, n-propyl, is-propyl, n-butyl, sec-butyl, pentyl, neo-pentyl, n-hexyl, iso-hexyl, heptyl, n-octyl 4,4-dimethyl pentyl, 2-ethyl hexyl, 2,2,4-trimethylpentyl, and the like.

Exemplary of "acyl" groups are the acyl groups having from 1 to 18 carbon atoms inclusive such as alkanoyl, alkenoyl, aroyl, substituted derivatives thereof, and the like. Typical alkanoyl groups include formyl, valeryl, acetyl, propionyl, heptanoyl, actanoyl, undecanoyl, lauroyl, palmitoyl, stearoyl, oleoyl, isomeric forms thereof, and the like; typical alkenoyl groups include acryloyl, methacryloyl, crotonyl, 3-butenoyl, β-methyl-α-butenoyl, and the like; typical aroyl groups such as benzoyl, phenylacetyl, cinnamoyl, naphthoyl, p-ethoxybenzyl, allyloxyphenylacetyl, and the like. Examples of other acyl moieties within the scope of the invention are carboxacyl moieties such as cyclohexanecarbonyl, 3-cyclohexanecarbonyl, p-chlorophenoxyacetyl, succinyl, p-nitrobenzoyl, furoyl, 3-pyridinecarbonyl, and the like.

The phrase "pharmaceutically acceptable" or "non-toxic salts" as used therein generally includes the non-toxic alkali metal and the non-toxic alkaline earth bases such as sodium, potassium, calcium, lithium, copper and magnesium, the hydroxides and the carbonates thereof, the ammonium salts and the substituted ammonium salts, for example, the non-toxic salts of trialkylamines, such as triethylamine, trimethylamine, tri-isopropylamine, tri-n-propylamine, tri-n-butylamine, and other amines such as morpholine, diethylamine, dimethylamine, methyl-cyclohexylamine, ethyl-cyclohexylamine, glucosamine, procaine, dibenzylamine, triethanolamine, N-benzyl-β-phenylethylamine, ethyldimethylamine, tripropanolamine, N-benzyl-β - phenylmethylamine, ethyldipropylamine, ethyl-di-isopropylamine, benzylamine, p-ethoxybenzylamine, N-(lower)alkyl piperadines, such as N-ethylpiperidine, N-isopropylpiperidine, N-methylpiperidine and other pharmaceutically acceptable amines. Also, the non-toxic salts of Formula 1 with monoalkyl and dialkylamines, and tetra-alkylammonium hydroxides. The latter are art called therapeutically acceptable quaternary ammonium salts.

The compounds of Formula 1, its carboxylate esters, alcoholic esters, salts, diastereomers, and enantiomers are prepared from 15(R)-hydroxy-9-oxo-5-cis,10,13-trans-prostatrienoic acid, its carboxylate ester or alcoholic ester, or its diesters, and salts thereof as embraced by Formula 2:

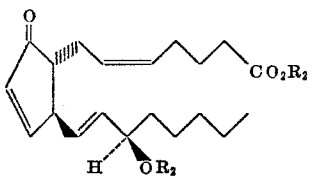

Formula 2 wherein $R_1$, and $R_2$ are as defined supra.

The starting compounds used for the purpose of this invention, as illustrated by generic Formula 2, for example, lower alkyl 15(R) - acyloxy-9-oxo-5-cis,10,13-trans-prostatrienoate, and its alcohol and acid derivatives, specifically methyl 15(R)-acetoxy-9-oxo-5-cis,10,13-trans-prostatrienoate are isolated from the gorgonian *Plexaura homomalla (esper)*. The *Plexaura homomalla* consists of two parts, an outer cortex and an inner skeleton. The compounds of the Formula 2 can be isolated from the intact gorgonian or from its outer cortex. The cortex can be easily separated from the skeleton in either a wet or dry form. When the dry form is employed, the gorgonian is air dried for several days at room temperature and the cortex stripped from the skeleton. Next, the cortex is ground to a fine mesh size in a conventional laboratory grinder. The resulting ground material is then extracted with an organic solvent, such as hexane, petroleum ether and the like, or with an aqueous media that forms an aqueous emulsion that itself can be extracted with an organic solvent to produce a crude extract of the gorgonian, *Plexaura homomalla*. The crude extract is next separated by chromatographic procedures, for example, column chromatography, thin layer chromatography, paper chromatography or the like to obtain the starting compounds. The isolation of prostaglandin derivatives from *Plexaura homomalla* is reported in Tetrahedron Letters No. 59, pages 5185 to 5188, 1969.

The next step in the preparation of compounds suitable for the present purpose and as embraced by Formula 1 consists in chemically contacting and selectively hydrogenating the ethenoid double bond or bonds present in the compounds of Formula 2, for example, the carbon to carbon double bond in the cyclopentane ring, or the carbon to carbon double bond in the carboxylic acid side chain, or both, to produce saturated carbon to carbon bonds. Hydrogenation of the ethylenic double bond or bonds is achieved without adversely affecting the total compound by using hydrogenation catalysts in the presence of a non-hydroxylic organic solvent, and exposing the reaction mixture to hydrogen. The hydrogenation is carried out at temperatures from —70° C. to 100° C., or higher, usually from 0° to 25° C., generally at room temperature, 25° C., and at atmospheric pressure or higher atmospheric pressures up to 25 atmospheres. The hydrogenation is allowed to continue until one mole of hydrogen is consumed for the saturation of one carbon to carbon double bond, or two moles or more of hydrogen for the saturation of two or more ethylene double bonds. Generally, about 5 to 30% by weight of catalysts is employed, although good results are obtained with smaller or larger quantities. Examples of catalysts suitable for the hydrogenation process include noble metal catalysts, for example, palladium or rhodium, usually rhodium on alumina, rhodium or carbon, palladium on charcoal, palladium on carbon, chlorotris(triphenylphosphine) rhodium, and the like. Examples of non-hydroxylic organic solvents suitable for the reaction medium include inert organic solvents such as ethyl acetate, ethylene glycol, dimethyl ether, tetrahydrofuran, dioxane, benzene, toluene, methanol and the like. When the hydrogenation is completed, the hydrogenated product is recovered by eliminating the catalyst by filtration and the solvent evaporated to dryness, or the desired product can be conveniently recovered by first neutralizing the catalyst by diluting the reaction medium with water and extracting with a water immiscible solvent such as methylene chloride, cyclohexane, benzene and the like; then, washing with alkali and employing chromatography on synthetic magnesium silicate, silica gel or the like, or by distillation or by other conventional recovery processes to yield the hydrogenated product.

Next, the substituent at the C–15(R) position of the hydrogenated prostatrienoic acid or its derivatives are converted to the corresponding diastereoisomeric C–15 ester, by epimerization comprising chemically contacting and reacting stoichiometric amounts of the hydrogenated compound with at least stoichiometric equivalent amounts or with an excess of from 1 to about 10 or more molecular equivalents of an aliphatic acid of the formula $$C_nH_{2n+1}COOH$$

wherein $n$ is 0 to 5 inclusive, and in the presence of trace to equal molar quantities or an excess thereof of the acid's corresponding alkali metal or alkaline earth metal salt of the general formula $(C_nH_{2n+1}CO_2)_xM$ wherein M is an alkali metal or an alkaline earth metal and $x$ is 1 or 2 to produce, from the selectively hydrogenated derivatives of Formula 2, the corresponding diastereoismeric C-15 ester. The alkali metal salt or the alkaline earth metal salt can be added directly to the reaction comprising the hydrogenated form embraced by Formula 2 and the aliphatic acid or it can be formed in situ by the reaction of at least equal molar amounts of the aliphatic acid with equal molar amounts or an excess thereof of an alkali metal base or alkaline earth metal base of the formula $M(OH)_x$ wherein M and $x$ are as defined above. The C-15 esters are generally produced at a temperature of about 10° C. to 40° C., at a pressure of 1 atmosphere to 10 atmospheres, with an accompanying reaction period of about 5 minutes to about 66 hours, and the like.

The diastereoisomeric C-15 esters are next converted to the corresponding diastereoisomeric C-15 hydroxylates by hydrolyzing the respective ester with at least stoichiometric amounts or with an excess thereof of a lower alkanol and in the presence of a small amount of an acid catalyst to produce the diastereoisomeric C-15 hydroxylates. The hydrolyzing reaction can be carried out with or without stirring at temperatures from 0° C. to 70° C. for about ½ hour to 25 hours, at a pressure of 1 atmosphere to 5 atmosphere or higher, or until the formation of the diastereomeric C-15 hydroxylate is completed. The hydrolyzing reaction is usually carried out by gently stirring and warming the reaction mixture at about 5° C. to 75° C. to ensure a mixing of the reactants, and then allowing the reaction mixture to stand and the reactants to react at ambient temperature and pressure, usually 25° C. and 1 atmosphere for about 1 hour to 25 hours. The C-15 hydroxylates are recovered from the reaction medium by adding aqueous sodium choride solution or brine to the reaction mixture and then extracting the just formed aqueous reaction mixture with a water immiscible organic solvent. The separated organic solvent extract is evaporated to dryness to yield a mixture containing the diastereoisomeric C-15 hydroxylates.

The C-15 hydroxylates present in the mixture are separated from each other by first dissolving the mixture in an organic solvent, for example, benzene, and then washed onto a column comprising about 40 to 60 grams of column support, for example, silicic acid, silica gel and the like, for each gram of mixture containing the C-15 hydroxylates. The compounds are then chromatographically separated by eluting them from the column with an elutant, for example, 10% to 20% ethyl acetate in benzene fractions; fractions of about 75 to 125 mls. collected to obtain C-15 hydroxyl compounds.

The diastereoisomeric hydroxylates can be separated into the diastereoisomers by using column chromatography on active support column systems, such as, acid washed silica gel, silicic acid, synthetic magnesium silicate, acidic alumina, neutral alumina, mixtures thereof, and the like, with elution of the diastereoisomers with lower alkanoates such as ethyl acetate, propyl acetate, methyl butyrate, mixtures thereof, mixtures of these with cyclohexane, benzene, ethanol, and the like, elutants consisting of ethyl acetate-hexane-water-methanol-acetic acid, ethyl acetate and more polar additives such as ethyl acetate-formic acid, ethyl acetate-acetone-acetic acid, cyclohexane-ethyl acetate-acetic acid and the like, to yield the diastereoisomers; J. Lipid Research, vol. 10, pages 316 to 319, 1969.

Examples of aliphatic acid of the general formula $C_nH_{2n+1}COOH$ as defined above are acids such as formic, acetic, propionic, butyric, valeric, the isomeric forms thereof, and the like.

Examples of the alkali metal or alkaline earth metal salts of the general formula $(C_nH_{2n+1}CO_2)_xM$ are where M is a metal comprising Group I-A of the periodic system comprising lithium, sodium, potassium, rubidium and cesium; and also where M is a metal of Group II-A of the periodic system comprising calcium, strontium, barium, and magnesium. Typical salts include sodium formate, sodium acetate, calcium propionate, barium valerate, lithium acetate and the like.

Exemplary alkaline earth metal bases and alkli metal bases include lithium hydroxide, sodium hydroxide, potassium hydroxide, cesium hydroxide, calcium hydroxide, barium hydroxide, magnesium hydroxide, and the like.

Representative of lower alkanols are alkanols of 1 to 8 carbons inclusive, of the straight or branched chain type, such as methanol, ethanol, iso-propanol, n-butanol, n-pentanol, hexanol, octanol, 1,1-dimethyl propanol, and the like.

Representative of acid catalysts suitable for performing the reactions are p-toluenesulfonic acid, hydrochloric acid, anhydrous hydrobromic acid, Lewis acids, such as boron trifluoride, boron trifluoride ethereate, boron trichloride ethereate, stannic oxychloride, phosphorous oxychloride, phosphorous pentachloride, and the like. Representative of water immiscible solvents generally include benzene, toluene, carbon tetrachloride, ether, cyclohexane, methylene chloride, and the like.

The carboxylate esters of the novel and useful prostaglandins of the invention are obtained art known chemical procedures, for example, by reacting the prostaglandin (when $R_1,R_2=H$) with solution containing a diazo-(lower)alkane to produce the prostaglandin carboxylate alkyl ester. Esterification of the prostaglandin acid is performed by reacting the prostaglandin acid with the diazoalkane, for example, diazomethane, diazoethane, diazopropane, diazobutane, etc., in an inert organic solvent, for example, lower alkanols, symmetrical and unsymmetrical ethers, and halogenated solvents. Representative of suitable solvents are ethanol, methanol, propanol, diethyl ether, methylethyl ether, tetrahydrofuran, acetone, cyclohexane, chloroform, etc., or with mixtures thereof. The esterification reaction is usually performed at a temperature of 0° C. to 75° C., usually at room temperature and atmosperic pressure, or at higher pressures, with the prostaglandin ester recovered by evaporation of the solvent and like techniques. The esterification reaction is described in Organic Chemistry, by Fieser and Fieser, pages 180 to 181, 1944.

The esterification of the prostaglandins (when $R_1,R_2=H$) can also be carried out by forming a salt of the organic acid followed by reacting the salt with a hydrocarbyl halide. For example, the silver salts of the prostaglandin is made by art known processes, such as dissolving the prostaglandin in cold, diluted aqueous ammonia, next, evaporating the excess ammonia in vacuo, and then adding stoichiometric amounts or an excess of silver nitrate, followed by reacting the salt with a suitable halide such as methyl iodide, butyl iodide, iso-propyl iodide, tert-butyl iodide, benzyl iodide, and the like; Textbook of Organic Chemistry, Richter, G. H., 1952, John Wiley & Sons.

The hydroxyl group of the prostaglandins at position C-15 can be esterified by reacting an acylating agent with the hydroxyl group in an organic medium. Examples of acylating agents suitable for esterifying the hydroxyl group include anhydrides, mixed anhydrides, chlorides of alkanoic acids and the like. Exemplary anhydrides include acetic anhydride, butyric anhydride, propionic anhydride, iso-propionic anhydride and the like. Exemplary acid chlorides include acetyl chloride, propionyl chloride, iso-propionyl chloride, butyryl chloride, decanoyl chloride, succinyl chloride, acryloyl chloride and the like. The acylation is carried out by contacting and reacting the prostaglandin bearing the hydroxyl group with, for example, an acid anhydride in the presence of a solvent, for example, triethylamine, trimethylamine, pyridine or the like at a temperature of 5° C. to 75° C., usually at 25° C. for 12 hours to 60 hours and at a pressure of 1 atmosphere to 5 atmosphere or higher. Generally, the reactants are present in equivalent amounts or in excess thereof, for example, 1 to 10 moles of anhydride to 1 mole of hydroxyl reactant. The acylated product is recovered by decomposing the unreacted acylating agent with water and extracting with an organic solvent, such as ether, and isolating the acylated compound by evaporating the solvent.

The prostaglandins, as embraced by the above Formula 1, can be converted to its non-toxic, pharmaceutically acceptable salt ($R_1=H$) by neutralizing the prostaglandin with an equivalent or an excess amount of the corresponding non-toxic salt forming organic or inorganic base. The salts are prepared by procedures known to the art, for example, equivalent or stoichiometric quantities of the prostaglandin and the organic base are dissolved in an inert organic solvent at room temperature or in a warmed solvent with a gentle mixing of the reacting prostaglandin and the base until all the reactants are in solution. The product or salt is obtained by chilling the resulting mixture to precipitate the powder or crystals, or the product can be isolated by the addition of a miscible diluent of low polarity, or by the use of standard evaporation techniques. The formation of inorganic prostaglandin salts is also carried out by procedures known to the art; for example, the prostaglandin is dissolved in an aqueous solution containing stoichiometric amounts or an excess amount of a non-toxic salt forming inorganic hydroxide, carbonate or the like. This reaction can be carried out in the presence of an inert organic solvent, and the product is obtained by procedures such as the evaporation of the aqueous medium, or the organic medium, by the addition of miscible solvents of low polarity, or by chilling the mixture to precipitate the product.

The amount of prostaglandins embraced by Formula 1 used for preventing the clumping of platelets will of course depend upon the amount of platelets being processed and the volume of the media containing the platelets. Generally about 50 nanograms (0.05 micrograms) to about 2000 nanograms (2 micrograms) of prostaglandin of Formula I will be used for each 1 milliliter of plasma containing platelets, or to 1 milliliter of a plasma rich platelet concentrate. The usual amount is about 100 nanograms (0.1 micrograms) for 1 ml. of plasma. The prostaglandins can be used alone, or they can be used by mixing them with therapeutically acceptable carriers such as isotonic saline, sterile water, poly(vinyl pyrrolidone), poly(vinyl alcohol), dextran, sodium alginate, and the like.

The following examples are set forth as representative methods of the spirit of the invention. These examples are not to be construed as limiting the scope of the invention as other functionally equivalent means will be readily apparent to those skilled in the subject art in the light of the present specification and accompanying claims.

EXAMPLE 1

Preparation of methyl 15(R)-acetoxy - 9 - oxo-5-cis, 10,13-trans-prostatrienoate, the methyl acetate diester of 15-epi-PGA$_2$, as depicted in Formula 2. First, 450 grams of gorgonian *Plexaura homomalla* is freshly dried at room temperature and the cortex stripped from the inner skeleton. Then, the removed cortex is ground to a fine mesh, and the ground cortex is extracted with commercially available, standard grade hexane. The cortex is extracted by placing the ground cortex in a conical filter funnel equipped with filter paper and extracted with hexane by passing the hexane over the ground cortex until the resulting solution showed no observable color. The excess solvent from the extract is removed on a conventional rotary evaporator, and the last traces of solvent are removed using a standard, high vacuum pump until a constant weight is recorded. About 43 grams of hexane extractables are extracted from the employed quantity of gorgonian.

Next, the hexane extract is subjected to conventional fractionation techniques. The fractionation technique employed consists of a first column chromatography using a 2.5 inch diameter column packed with 490 grams of silicic acid, commercially available as SilicAR$^{(R)}$CC-7, using benzene as the solvent for the packing procedure. Next, 83 grams of the crude extract obtained according to the procedure described immediately above, is placed on the column in a benzene solution and it is washed onto the column with more benzene. The crude extract is then eluted from the column using measured volumes of solvents of increasing polarity as follows: first, 4000 ml. of benzene; second, 1000 ml. of 20% ethylacetate in benzene; third, 1000 ml. of 40% ethylacetate in benzene; fourth, 1000 ml. of 60% ethyl acetate in benzene; and, fifth, 1000 ml. of ethylacetate. The percent recovered is 90.6.

Further purification and isolation of the compound is carried out as follows: first, 70 grams of silicic acid (CC-4) is packed into a 1.25 inch diameter column as a benzene slurry. After preparing the column, it is washed with about 500 ml. of benzene. Next, 1.5 grams of the sample obtained from the 20% ethyl acetate in benzene fraction of the 2.5 inch column is washed into the smaller 1.25 inch column, with benzene. The fraction is eluted from the latter column by using 8% ethyl acetate in benzene, and at a flow rate of 2 ml. per minute, and 13 fractions of 50 ml. each were taken. Fractions 6 to 12 contain the prostaglandin diester. Thin layer chromatography is used to identify the diester. The analytical results are as follows: high resolution mass spectrum (m−60=330.2187; i.e., $C_{21}H_{30}O_3$): the mass spectrum showed peaks at m/e of 390, 359, 330, and 190 (base peak); ORD spectrum (CH$_3$OH) peak at 247 m$\mu$ and through at 218 m$\mu$; UV$_{max}$ (MeOH) 215 m$\mu$, $\epsilon$=9,300. The IR spectra shows peaks at IR (film) 1735, 1710, 1585, 1455, 1435, 1370, 1310, 1240, 1165, 1015, 965, 885, 810, and 720 cm.$^{-1}$ and IR (CHCl$_3$) 1730, 1710, 1585, 1455, 1435, 1370, 1310, 1240, 1205, 1170, 1145, 1015, 965, and 880 cm.$^{-1}$. The NMR spectrum (CCl$_4$) shows peaks $\delta$7.44 (1, dd, J=z, 6 Hz.), 6.12 (1, dd, J=2, 6 Hz.), 5.48 (4 proton vinyl envelopes), 5.14 (1, m), 3.61 (3,6) 1.98 (3, S), and 0.89 (3, perturbed triplet).

EXAMPLE 2

Preparation of methyl 15(R)-acetoxy - 9 - oxo - 5-cis, 13 - trans - prostadienoate. First, a 0.885 gram (2.27 mmole) sample of methyl 15 (R)-acetoxy - 9 - oxo-5-cis,10,13 - trans - prostatrienoate, as prepared according to Example 1, was dissolved, with constant stirring, in 16 ml. of commercially available ethyl acetate, having a density of 0.885 (g./ml. at 25° C.). Then, 0.10 grams of rhodium catalyst (5% supported on carbon) was added to the mixture and it was cooled to 0° C. A vacuum was applied to the mixture to remove oxygen, and the mixture was magnetically stirred during the evacuation to aid in removing oxygen from the mixture. The apparatus containing the mixture was then filled with hydrogen gas, evacuated, and the evacuation procedure repeated three times followed by the addition of hydrogen to assure the absence of oxygen from the apparatus. After the last evacuation, the reaction mixture was magnetically stirred at 0° C. under one atmosphere of hydrogen pressure for approximately 3½ hours. Samples of the reaction mixture were periodically taken and analyzed by silver nitrate thin layer chromatography (TLC) and by mass spectroscopy. After about 3½ hours, the TLC analysis did not show any starting material in the reaction mixture.

The reaction mixture was filtered through Celite®, diatomaceous silica, with ethyl acetate washings under vacuum. On concentration in vacuo of the ethyl acetate solution, 0.874 grams of crude product was recovered. The product was chromatographed on 50 grams of 10% silver nitrate impregnated SilicAR® CC–4, 100–200 mesh, in a ¾ inch diameter column using 10% ethyl acetate in hexane to elute the product. The eluent was analyzed by thin layer chromatography and after approximately 1000 ml. were collected, the product (0.4029 gm.) was eluted in the next 1000 ml. of eluent. The product, methyl 15(R)-acetoxy-9-oxo - 5 - cis,13 - trans-prostadienoate, showed mass spectrum peaks at 392 (M+) and 332 (M–60). The nuclear magnetic resonance (NMR) spectrum showed a loss of characteristic absorptions of the starting material at δ7.4, 6.1 and 3.2 attributed to the absence of the 10,11 carbon carbon double bond, due to the absorption of one mole equivalent of hydrogen, while retaining the other characteristic signals of the starting compound methyl 15(R)-acetoxy - 9 - oxo-5-cis,10,13-trans-prostatrienoate.

EXAMPLE 3

Preparation of methyl 15(R)-acetoxy-9-oxo-13-trans-prostenoate. A 0.252 gram (0.65 mmole) sample of methyl 15(R)-acetoxy-9-oxo - 5 - cis,10,13 - trans-prostatrienoate, prepared according to Example 1, was dissolved in 8 ml. of ethyl acetate containing 65 mg. of 5% rhodium on carbon and hydrogenated under one atmosphere at 25° C. for 1 hour. The reaction mixture was filtered through Celite® under vacuum with ethyl acetate washings. After concentration of the solvent, 0.226 grams of oily product was recovered. Analysis of the product by silver nitrate thin layer chromatography showed no remaining starting material. The product was chromatographed on a column containing 10 grams of 10% silver nitrate impregnated SilicAR® CC–4, using 8% ethyl acetate in hexane as the elutant. The mass spectrum showed peaks at 394 (M+) and 334 (M–60), and the NMR spectrum showed loss of signals characteristic of the C–5 and C–10 double bonds of the starting material, while retaining the signal for the trans C–13 double bond.

EXAMPLE 4

Preparation of diastereomeric methyl 15-formoxy-9-oxo-5-cis,13-trans-prostadienoate. A 300 mg. sample of methyl 15(R) - acetoxy - 9 - oxo - 5 - cis,13 - trans-prostadienoate as prepared according to Example 2 is dissolved in a reaction medium obtained by reacting 8 ml. of formic acid and 80 mg. of potassium carbonate to form in situ potassium formate, and the mixture constantly stirred to ensure a contacting of the reactants. The reaction is allowed to proceed for about 70 hours at room temperature and then the solvent is evaporated on a rotary evaporator at about 30° C. with in-house vacuum assist. Next, about 20 ml. of toluene is added to the residue and the mixture shaken and again evaporated to remove any remaining formic acid. The residue is taken up in 50 ml. of benzene and filtered with benzene washing to eliminate inorganic salts. The solvent is again evaporated to give a mixture of diastereomeric formates as determined by NMR spectroscopy. The product mixture weighed about 0.290 grams.

EXAMPLE 5

Preparation of diastereomeric methyl 15-formoxy-9-oxo-13-trans-prostenoate. A 200 mg. sample of diastereomeric methyl 15(R)-acetoxy-9-oxo-13-trans-prostenoate as prepared according to Example 3 is dissolved in a reaction medium obtained by reacting 8 ml. of formic acid and 80 mg. of potassium carbonate to form in situ potassium formate and the mixture constantly stirred to ensure a contacting of the reactants. The reaction is allowed to proceed for about 70 hours at ambient conditions and then the solvent evaporated on a rotary evaporator at about 30° C. with in-house vacuum assist. Next, about 20 ml. of toluene is added to the residue and the mixture shaken and again evaporated to remove the remaining formic acid. The residue is then filtered through a small column with an inside diameter of 1.0 inches containing 30 grams of silicic acid, commercially available as SilicAR® CC–7, using 20% ethyl acetate in benzene as the eluting solvent. The solvent is again evaporated to give a crude weight of 0.180 grams of a mixture of diastereomeric formates.

EXAMPLE 6

Preparation of diastereomeric methyl 15-hydroxy-9-oxo-5-cis,13-trans-prostadienoate. A 56 mg. sample of the product prepared according to the procedure of Example 4 is dissolved in 10 ml. of a freshly prepared mixture consisting of 95% dry methanol and 5% 1 N hydrochloric acid with slight stirring to ensure a complete mixing of the ingredients. Next, the solution is magnetically stirred at room temperature and pressure for about 24 hours. The product is then recovered from the reaction solution by first removing most of the methanol by stripping in vacuo, followed by adding 50 ml. of 100% ethyl acetate to the residue and extracting the ethyl acetate residue mixture three times with 10 ml. portions of 50% brine. The organic, ethyl acetate phase, with washings, were combined, dried over anhydrous MgSO$_4$ and evaporated to yield 0.048 grams of a mixture of diastereomeric methyl 15 - hydroxy-9-oxo-5-cis,13 - trans-prostadienoate. These diastereomers are separated by column chromatography.

EXAMPLE 7

Preparation of 15(S) - hydroxy-9-oxo-13-trans-prostenoic acid. First, 0.25 grams of methyl 15-formoxy-9-oxo-13-trans-prostenoate, as prepared according to Example 5, was dissolved in 20 ml. of methanol containing 0.36 gram of potassium hydroxide and the reaction mixture magnetically stirred for about 3 hours. Next, the reaction mixture was acidified with 1 N HCl and 20 ml. of saturated brine added to the acidified reaction mixture. Next, the aqueous phase was extracted 5 times with 50 ml. aliquots of chloroform, and the organic phases dried over anhydrous magnesium sulfate. The organic phases were then combined and concentrated in vacuo to yield 0.20 gram of crude product. The diastereomers were separated on a 20 gram column of, commercially available, SilicAR® CC–4, using 11% ethyl acetate in benzene to elute the isomers. The first isomer eluted was 15(R)-hydroxy-9-oxo-13-trans-prostenoic acid, which was followed by 15(S)-hydroxy-9-oxo-13-trans-prostenoic acid.

EXAMPLE 8

Preparation of propyl 15(S)-hydroxy-9-oxo-13-trans-prostenoate. A solution of 1 mole of 15(S)-hydroxy-9-oxo-13-trans-prostenoic acid in a mixture of 10 ml. of dry methanol and 90 ml. of dry diethyl ether is mixed at room temperature with an excess of diazopropane in diethyl ether and allowed to stand for about 60 minutes. The mixture is evaporated to dryness under reduced in-house pressure to obtain the product comprising propyl 15(S)-hydroxy-9-oxo-13-trans-prostenoate.

EXAMPLE 9

Following the procedure of Example 8 but substituting for diazopropane other diazoalkanes, for example, diazoethane, diazobutane, diazohexane, and the like, to produce esters such as ethyl 15(S)-hydroxy-9-oxo-13-trans-prostenoate, butyl 15(S) - hydroxy-9-oxo-13-trans-prostenoate, hexyl 15(S)-hydroxy-9-oxo-13-transprostenoate, and the like.

EXAMPLE 10

Preparation of platelet rich plasma: first, about 430 ml. of fresh mammalian whole blood is collected into a container containing about 70 ml. of ACD (acid-citratedextrose) solution (U.S.P. Formula A), and the container is centrifuged at 375×g for about 15 minutes at 20° C. After completion of the centrifuge period, the upper plasma portion containing the platelets is separated from the lower blood portion and it is transferred to a second chemically inert container. About 220 ml. of platelet rich plasma is transferred from the first container to the second container that has about 20 micrograms of 15(S)-hydroxy-9-oxo-13-trans-prostenoic acid therein for the purpose of preserving and maintaining the functionality of the platelets in the plasma. This latter container may be stored or its contents may be immediately used for its intended purpose. When used, the plasma container is centrifuged at 1,500×g, for 15 minutes and at 20° C. to produce a separation of the plasma from the platelets. The upper plasma portion that separated from the platelets is decanted from the container and the viable, non-aggregated platelet concentrate can now be used for its intended purpose.

EXAMPLE 11

Preparation of platelets containing methyl 15(S)-hydroxy-9-oxo-13-trans-prostenoate. First, 430 ml. of fresh whole blood is collected into the first pack of a conventional blood bank triple-pack system with 70 ml. of acid citrate dextrose in the first pack. The blood pack is centrifuged at 375g for 15 minutes, and about 200 ml. of plasma is transferred from the first pack to the second pack. Next, 30 micrograms of methyl 15(S)-hydroxy-9-oxo-13-trans-prostenoate is added to the plasma for essentially inhibiting the clumping of the platelets. The contents of the second pack can be used per se, or the second pack can be centrifuged at about 1,500g. for 15 minutes to concentrate the protected platelets and the supernatant plasma transferred to the third pack. About 20 to 25 ml. of plaelets containing methyl 15(S)-hydroxy-9-oxo-13-trans-prostenoate suspended in a few ml of plasma is left in the second pack.

The platelet anti-aggregation activity and the stability of the compounds of Formula 1 as used for the purpose of this invention is seemingly unobvious in the light of the prior art cited supra. For example, the prior art compound 11α,15(S)-dihydroxy-9-oxo - 13 - trans-prostenoic acid has a beta hydroxy ketone function that is unstable in acidic and basic environments wherein its eliminates water to form a different prostaglandin that has essentially no platelet anti-aggregation activity. The compounds used herein, for example, 15(S)-hydroxy-9-oxo-13-trans-prostenoic acid, and derivatives thereof, are stable under like conditions. The relative platelet anti-aggregation potencies of the compounds embraced by Formula 1 equals the potency of 11α,15(S)-dihydroxy-9-oxo-13-trans-prostenoic acid and is greater than the potency of more closely related 11α,15(S)-dihydroxy - 9 - oxo-prostanoic acid which possesses from 0.56 to 0.73% of the activity of the presently used compounds.

The above examples and disclosure are set forth merely for illustrating the mode and the manner of the invention and various modifications and embodiments can be made by those skilled in the art in the light of the invention without departing from the spirit of the invention.

I claim:

1. A method for inhibiting platelet aggregation by adding to platelets an effective amount, to essentially inhibit platelet aggregation, of a platelet anti-aggregation compound of the general formula:

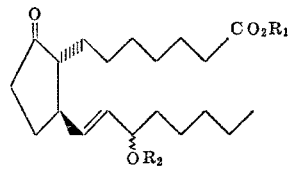

wherein $R_1$ is a member selected from the group consisting of hydrogen and lower alkyl, $R_2$ is a member selected from the group consisting of hydrogen and alkanoly of 1 to 18 carbon atoms, the diastereomers and pharmaceutically acceptable salts thereof.

2. A method for inhibiting platelet aggregation according to claim 1 wherein the compound is lower alkyl 15(S)-hydroxy-9-oxo-13-trans-prostenoate.

3. A method for inhibiting platelet aggregation according to claim 1 wherein the compound is lower alkyl 15(S)-alkanoyloxy-9-oxo-13-trans-prostenoate.

4. A method for inhibiting platelet aggregation according to claim 1 wherein the compound is 15(S)-alkanoyloxy-9-oxo-13-trans-prostenoic acid.

5. A method for inhibiting platelet aggregation according to claim 1 wherein the compound is 15(S)-hydroxy-9-oxo-13-trans-prostenoic acid.

6. A method for inhibiting platelet aggregation according to claim 1 wherein from 50 nanograms to 2000 nanograms of the platelet anti-aggregation compound is added to each milliliter of plasma containing platelets.

7. A method for inhibiting platelet aggregation according to claim 1 wherein from 50 nanograms to 2000 nanograms of the platelet anti-aggregation compound is added to each milliliter of plasma platelet concentrate.

References Cited

Sekhar—J. of Med. Chem., vol. 13 (1970), pp. 39–44.

SAM ROSEN, Primary Examiner

U.S. Cl. X.R.

424—305, 318